(12) United States Patent
Bux et al.

(10) Patent No.: US 8,799,561 B2
(45) Date of Patent: Aug. 5, 2014

(54) VALID PAGE THRESHOLD BASED GARBAGE COLLECTION FOR SOLID STATE DRIVE

(75) Inventors: Werner Bux, Richterswil (CH); Robert Haas, Ossining, NY (US); Xiao-Yu Hu, Horgen (CH); Ilias Iliadis, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/560,065

(22) Filed: Jul. 27, 2012

(65) Prior Publication Data

US 2014/0032817 A1     Jan. 30, 2014

(51) Int. Cl.
*G06F 12/02* (2006.01)
(52) U.S. Cl.
CPC ........ *G06F 12/0246* (2013.01); *G06F 12/0253* (2013.01); *G06F 2212/7205* (2013.01); *G06F 12/0261* (2013.01)
USPC ....... 711/103; 711/156; 365/185.33; 707/814
(58) Field of Classification Search
CPC ............ G06F 12/0246; G06F 12/0253; G06F 12/0261; G06F 2212/7205
USPC ............... 711/103, 156; 365/185.33; 707/814
See application file for complete search history.

(56) References Cited

U.S. PATENT DOCUMENTS

| 7,562,181 | B2 * | 7/2009 | Sinclair et al. | 711/103 |
| 7,590,794 | B2 * | 9/2009 | Sinclair et al. | 711/103 |
| 7,590,795 | B2 * | 9/2009 | Sinclair et al. | 711/103 |
| 7,610,437 | B2 * | 10/2009 | Sinclair et al. | 711/103 |
| 8,166,233 | B2 * | 4/2012 | Schibilla et al. | 711/103 |
| 8,521,948 | B2 * | 8/2013 | Post et al. | 711/103 |
| 8,566,505 | B2 * | 10/2013 | Kilzer et al. | 711/103 |
| 2011/0055458 | A1 * | 3/2011 | Kuehne | 711/103 |
| 2012/0311237 | A1 * | 12/2012 | Park | 711/103 |

OTHER PUBLICATIONS

Lee, et al., "A Semi-Preimptive Garbage Collector for Solid State Drives," Performance Analysis of Systems and Software (ISPASS), 2011 IEEE International Symposium on Performance Analysis of Systems adn Software (ISPASS), Apr. 2011, pp. 1-10.

\* cited by examiner

*Primary Examiner* — Stephen Elmore
(74) *Attorney, Agent, or Firm* — Cantor Colburn LLP; Daniel Morris

(57) ABSTRACT

A method for garbage collection in a solid state drive (SSD) includes determining whether the SSD is idle by a garbage collection module of the SSD; based on determining that the SSD is idle, determining a victim block from a plurality of memory blocks of the SSD; determining a number of valid pages in the victim block; comparing the determined number of valid pages in the victim block to a valid page threshold; and based on the number of valid pages in the victim block being less than the valid page threshold, issuing a garbage collection request for the victim block.

20 Claims, 3 Drawing Sheets

VALID PAGE THRESHOLD BASED GARBAGE COLLECTION FOR SOLID STATE DRIVE

BACKGROUND

This disclosure relates generally to computer memory devices, and more particularly to garbage collection in a solid state drive (SSD).

SSDs, which include flash memory devices, are rewritable non-volatile memory devices that use electronic circuitry for storing data. SSDs may be used for many types of computer memory, for example, local computer hard drives, peripheral storage, or storage for enterprise applications. SSDs offer relatively good bandwidth and random I/O (input/output) performance along with a relatively good lifespan due to an absence of moving parts.

SSD memory is organized in memory blocks. Each block includes a plurality of pages (a page is a relatively small unit of memory). Read and write operations in a SSD may be performed at the page level; however, erase operations may only be performed at the memory block level. Erase operations may also take more time to complete than read or write operations. In order to overwrite data (i.e., replace old data with updated data) that is stored in a memory block in a SSD, an erase operation of the entire memory block that holds the data to be overwritten must be performed. In order to overwrite data in a SSD, a writing technique referred to as "write out of place" may be applied, in which the updated data is written to a free (i.e., empty) page in the SSD memory instead of writing the updated data to the same page where old data resides. The page containing the old data is then marked as invalid page. An invalid page remains invalid until the entire memory block in which the invalid page is located is erased.

During operation of the SSD, garbage collection is performed to maintain a free block pool. The free block pool holds memory blocks that contain free pages that are available for writing new data. The free blocks are reclaimed from memory blocks that may be filled with both valid and invalid data. The garbage collection process first identifies a victim block for reclaiming. Any valid pages (i.e., pages containing data that has not been overwritten) residing in the victim block are copied to another memory block, and the victim block is erased, such that the entire victim block is now a free block for the free block pool. The garbage collection process requires read and write operations, in addition to the erase operation, that may compete with regular user read and write operations for access to the same memory and controller resources. Overly frequent garbage collection may increase write amplification in the SSD, which may increase the power consumption of the SSD and eventually decrease the lifespan of the SSD.

SUMMARY

In one aspect, a method for garbage collection in a SSD includes determining whether the SSD is idle by a garbage collection module of the SSD; based on determining that the SSD is idle, determining a victim block from a plurality of memory blocks of the SSD; determining a number of valid pages in the victim block; comparing the determined number of valid pages in the victim block to a valid page threshold; and based on the number of valid pages in the victim block being less than the valid page threshold, issuing a garbage collection request for the victim block.

In another aspect, a SSD includes a plurality of memory blocks, each of the plurality of memory blocks comprising a respective plurality of pages; and a SSD controller, the SSD controller comprising a garbage collection module, the garbage collection module being configured to perform a method including determining whether the SSD is idle; based on determining that the SSD is idle, determining a victim block from the plurality of memory blocks; determining a number of valid pages in the victim block; comparing the determined number of valid pages in the victim block to a valid page threshold; and based on the number of valid pages in the victim block being less than the valid page threshold, issuing a garbage collection request for the victim block.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
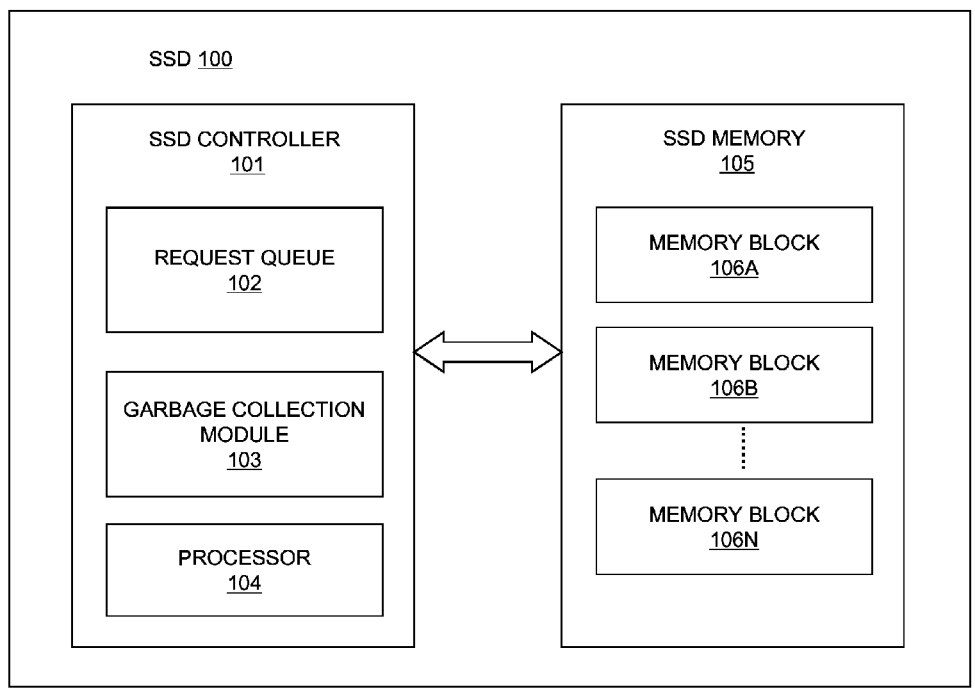
FIG. 1 is a schematic block illustrating an embodiment of a SSD including valid page threshold based garbage collection.

Embodiments systems and methods for valid page threshold based garbage collection for a SSD are provided, with exemplary embodiments being discussed below in detail. Garbage collection in a SSD may free up blocks in the SSD without significantly increasing write amplification in the SSD through application of a valid page threshold and an adjustable timeout period to the garbage collection process. When the SSD is determined to be idle, a victim block is determined. Once the victim block is determined, it is determined whether the number of valid pages in the victim block is less than a valid page threshold value. If the number of valid pages in the victim block is less than the valid page threshold, a garbage collection request is issued for the victim block, and the length of the timeout period may also be decreased. However, if the number of valid pages in the victim block is greater than the valid page threshold, the victim block is not garbage collected, and the length of the timeout period may be increased. Application of the valid page threshold and adjustable timeout period to garbage collection may reduce write amplification (which comprises a ratio of the total number of writes in the SSD, both user-generated and SSD-generated, to the number of user writes) in the SSD while ensuring a sufficient free block pool size for good SSD operation. Also, garbage collection operations may be confined to idle time in the SSD, reducing competition for resources between garbage collection and user read/write requests.

The determination that the SSD is idle may be performed by detecting a first idle condition in the SSD, starting the timeout period in response to detecting the first idle condition, and, if a second idle condition is detected in the SSD at the end of the timeout period, determining that the SSD is idle. The first and second idle condition may be determined based on a request queue of the SSD being empty. The duration of the timeout period affects the frequency of garbage collection operations in the SSD. A relatively long timeout period reduces the number of opportunities to grow the free block pool, and may be appropriate in circumstances in which the free block pool is currently relatively large. Because user read and write operations may be processed by the SSD during the timeout period, a relatively long timeout period also increases the chances of identifying a victim block with a number of valid pages that is less than the valid page threshold for garbage collection after the detection of the second idle condition. A relatively short timeout period may grow the free block pool relatively quickly; however, the load on the SSD controller may be increased by more frequent garbage collection operations, with possible detrimental consequences on the SSD controller's response time to other tasks and the controller's energy consumption. Therefore, the length of the timeout period may be adjusted during the garbage collection process based on the state of the SSD, as indicated by the number of valid pages in the determined victim block. A victim block having a number of valid pages that is less than the valid page threshold may trigger a decrease in the timeout period, while a victim block having a number of valid pages that is greater than the valid page threshold may trigger an increase in the timeout period.

The timeout period may be adjusted in any appropriate manner; for example, the timeout period may be increased or decreased exponentially in some embodiments. For example, the timeout duration may be doubled if the determined victim block has a number of valid pages less than the valid page threshold, and the timeout period may be halved if the determined victim block has a number of valid pages greater than the valid page threshold. Any appropriate factor may be used to exponentially adjust the timeout period in various embodiments. Adjustment of the timeout period may be lower-bounded by a timeout minimum value, and upper-bounded by a timeout maximum value. The timeout minimum and maximum values may comprise predetermined values in the SSD. The timeout period may be initially set to the timeout minimum value at startup of the SSD in some embodiments.

In some embodiments, valid page threshold based garbage collection may be disabled when a number of free blocks in the SSD is greater than a threshold T1, and enabled when a number of free blocks in the SSD is less than the threshold T1, so that the free block pool may be increased when the number of free blocks in the SSD is less than a free block threshold T1. In further embodiments, valid page threshold based garbage collection may be initially disabled at startup of the SSD, and only turned on when the number of free blocks in the SSD drops below T1. In yet further embodiments, valid page threshold based garbage collection may be disabled if the number of free blocks in the SSD drops below a second free block threshold T2 wherein T2 is less than T1, such that if the number of free blocks in the SSD drops below the second threshold T2, garbage collection operations may be given a higher priority with respect to user read/write operations. Garbage collection that is performed based on thresholds T1 and/or T2, which may be used in conjunction with some embodiments of valid page threshold based garbage collection is described in European Patent Application No. 11191378.6, which is assigned to International Business Machines Incorporated and which is herein incorporated by reference in its entirety. In other embodiments, valid page threshold based garbage collection may operate regardless of the number of free blocks currently available in the SSD; i.e., in such embodiments, the valid page threshold based garbage collection may be triggered solely based on the determination that the SSD is idle.

FIG. 1 illustrates an embodiment of a SSD 100 including a garbage collection module 103 that implements valid page threshold based garbage collection. The SSD 100 includes a SSD controller 101, which comprises a request queue 102, a garbage collection module 103, and a processor 104. The processor 104 executes read, write, and erase requests from the request queue 102. The requests in the request queue 102 comprise user read/write requests, and garbage collection requests, which include read, write and erase operations. An idle condition may be detected in the SSD 100 by garbage collection module 103 if there are no waiting requests in the request queue 102. The SSD 100 further includes a SSD memory 105, which includes a plurality of memory blocks 106A-N. Each of the plurality of memory blocks 106A-N comprise a plurality of pages. Any appropriate number of memory blocks 106A-N may be included in a SSD memory such as SSD memory 105, and each of the memory blocks 106A-N may include any appropriate number of pages. During operation of the SSD 100, pages in the memory blocks 106A-N may be invalidated by the "write out of place" data overwriting technique. Valid pages in the memory blocks 106A-N comprise pages that hold data that has not been overwritten, and free blocks of the memory blocks 106A-N comprise memory blocks that contain empty pages that may accept writes of new data. The garbage collection module 103 determines expiration of the timeout period, adjusts the timeout period, determines victim blocks from memory blocks 106A-N, and issues garbage collection requests into request queue 102 according to the method 200 illustrated in FIG. 2, which is discussed below. In some embodiments, the SSD 100 may include a plurality of counters (not shown), each counter associated with a respective memory block 106A-N, that each indicate a number of valid pages in the counter's associated memory block; in such an embodiment, these counters may be used to determine the victim block, as is discussed below with respect to block 205.

Figure 2:
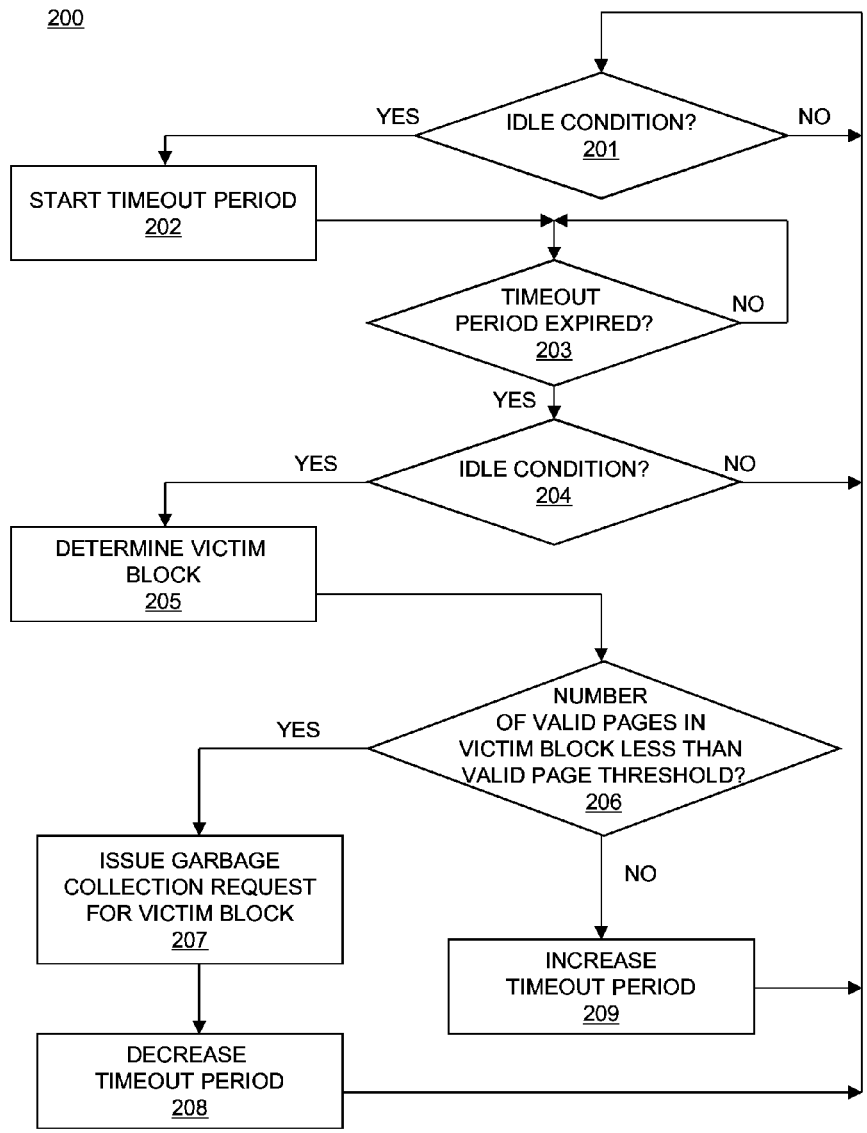
FIG. 2 is a flowchart illustrating an embodiment of a method for valid page threshold based garbage collection for a SSD.

FIG. 2 illustrates an embodiment of a method 200 for valid page threshold based garbage collection for a SSD, such as SSD 100 of FIG. 1. Method 200 may be implemented in garbage collection module 103. First, in block 201, a first idle condition in SSD 100 is detected. The first idle condition may be detected based on the request queue 102 being empty. When a first idle condition is detected in block 201, flow proceeds to block 202, in which the garbage collection module 103 starts the timeout period in response to detection of the first idle condition. Flow then proceeds to block 203, in which it is determined if the timeout period has expired, and then, when it is determined that the timeout period has expired in block 203, flow proceeds to block 204, and it is determined whether a second idle condition is detected in the SSD 100. User read/write requests may be issued into the request queue 102 and executed by the processor 104 during the elapsing of the timeout period during blocks 202 and 203; the second idle condition is detected in block 204 based on the request queue 102 being empty at the time of expiring of the timeout period. If, in block 204, the second idle condition is not detected, flow of method 200 returns to block 201, and the garbage collection module 103 awaits another idle condition.

If, in block 204, the second idle condition is detected, flow of method 200 proceeds to block 205, in which the garbage collection module 103 determines a victim block from memory blocks 106A-N. The victim block may be determined in any appropriate manner. In some embodiments, the memory blocks may be directly examined by the garbage collection module 103 to determine the victim block. In some embodiments, only a subset of the memory blocks 106A-N in the SSD memory 105 may be examined during the determination of the victim block by garbage collection module 103. In other embodiments, the SSD 100 may include a plurality of counters, each counter associated with a respective memory block 106A-N, that each indicate a number of valid pages in the counter's associated memory block; in such an embodiment, these counters may be used to determine the victim block. For example, a memory block of memory blocks 106A-N whose counter has reached the valid page threshold may be selected as the victim block by the garbage collection module in block 205.

After the victim block is determined in block 205, flow proceeds to block 206 of method 200, in which it is determined if the number of valid pages in the victim block is less than the valid page threshold. If the number of valid pages in the victim block is determined to be less than the valid page threshold in block 206, a garbage collection request (comprising copying the valid pages in the victim block to another block, and erasing the entire victim block) for the victim block is issued by garbage collection module 103 into request queue 102 in block 207, and flow then proceeds to block 208, in which the timeout period is decreased, subject to the timeout period minimum. Flow then proceeds from block 208 back to block 201. If the number of valid pages in the victim block is determined to be greater than the valid page threshold in block 206, the victim block is not garbage collected, and flow proceeds to block 209, in which the timeout period is increased, subject to the timeout period maximum. Flow then proceeds from block 209 back to block 201.

The value of the valid page threshold, to which the number of valid pages in the victim block is compared in block 206 of FIG. 2, may be selected in any appropriate manner. In some embodiments, the valid page threshold may be a predetermined value. In some embodiments, the valid page threshold may be equal to $(1-1/A)*c$, where A is a target write amplification value for the SSD, and c is the number of pages per memory block. A safety margin may be factored into the value of the valid page threshold by reducing the value given by $(1-1/A)*c$ by an appropriate percentage in some embodiments. In other embodiments, the garbage collection module 103 may compute an average number of valid pages per garbage collection operation that is performed by the garbage collection module. In such embodiments, the valid page threshold may be set equal to a most recently computed average of the number of valid pages per garbage collection operation, or, if a safety margin is desired, an appropriate percentage thereof. In further embodiments, the valid page threshold may be dynamically adapted to the current number of free blocks in the SSD. In such embodiments, when there is a relatively large numbers of free blocks, garbage collecting to free up additional blocks is less critical and may be performed only if the price paid, i.e., the number of relocated valid pages, is relatively small. Therefore, the valid page threshold may decrease (or at least not increase) based on the number of free blocks in the free block pool The timeout period minimum and maximum, which give the lower and upper bounds for increasing and decreasing of the timeout period in blocks 208 and 209 of method 200 of FIG. 2, may be selected in any appropriate manner. The amount by which the timeout period is increased and decreased in blocks 208 and 209 may also be selected in any appropriate manner. The timeout period may initially be set equal to the timeout period minimum at startup of the SSD 100 in some embodiments. In some embodiments, the timeout period minimum may be about a millisecond, and the timeout period maximum may be about a second. The timeout period may be increased and decreased exponentially by any appropriate factor in blocks 208 and 209 of method 200; for example, the timeout period may be doubled in block 209, and halved in block 208

Figure 3:
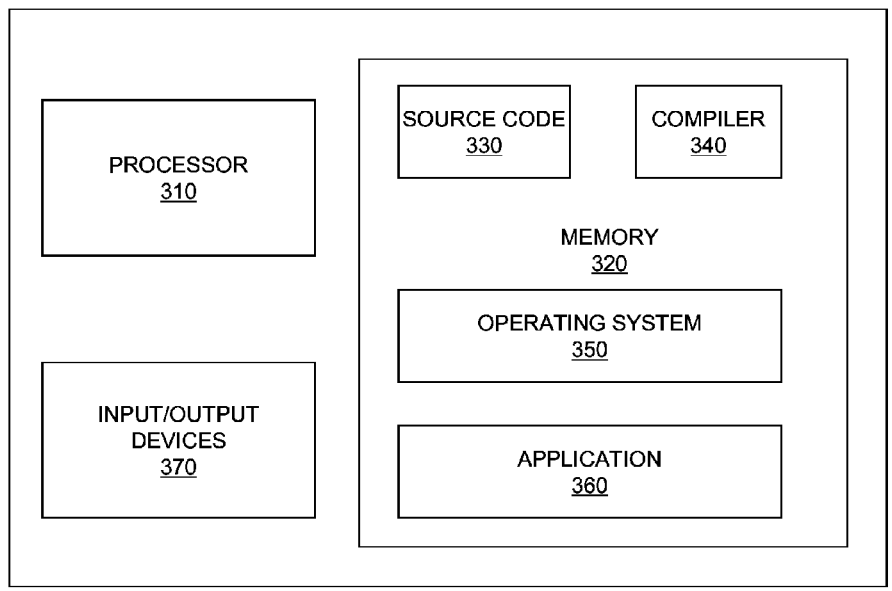
FIG. 3 is a schematic block illustrating an embodiment of a computer that may be used in conjunction with a SSD including page threshold based garbage collection.

FIG. 3 illustrates an example of a computer 300 which may be utilized by exemplary embodiments of a SSD implementing valid page threshold based garbage collection. Various operations discussed above may utilize the capabilities of the computer 300. One or more of the capabilities of the computer 300 may be incorporated in any element, module, application, and/or component discussed herein. For example, embodiments of a SSD implementing valid page threshold based garbage collection may be incorporated into memory 320, and/or a SSD implementing valid page threshold based garbage collection may comprise a peripheral device that communicates with computer 300 via input/output (I/O) devices 370.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more I/O devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include maintaining of a sufficient free block pool in a SSD without significantly increasing write amplification.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for garbage collection in a solid state drive (SSD), comprising:
   determining whether the SSD is idle by a garbage collection module of the SSD;

based on determining that the SSD is idle, determining a victim block from a plurality of memory blocks of the SSD;

determining a number of valid pages in the victim block;

comparing the determined number of valid pages in the victim block to a valid page threshold; and based on the number of valid pages in the victim block being less than the valid page threshold, issuing a garbage collection request for the victim block.

2. The method of claim 1, wherein determining that the SSD is idle comprises:

detecting a first idle condition in the SSD;

based on detecting the first idle condition, starting a timeout period;

based on an expiration of the timeout period, determining whether a second idle condition in the SSD is detected; and based on detecting the second idle condition, determining that the SSD is idle.

3. The method of claim 2, wherein the first and second idle conditions are detected based on a request queue of the SSD being empty.

4. The method of claim 2, further comprising, based on the number of valid pages in the victim block being greater than the valid page threshold:

determining whether a length of the timeout period is equal to a predetermined timeout period maximum; and based on the length of the timeout period being not equal to the predetermined timeout period maximum, increasing the length of the timeout period.

5. The method of claim 4, wherein increasing the length of the timeout period comprises multiplying the length of the timeout period by a predetermined factor.

6. The method of claim 2, further comprising, based on the number of valid pages in the victim block being less than the valid page threshold:

determining whether a length of the timeout period is equal to a predetermined timeout period minimum; and based on the length of the timeout period being not equal to the predetermined timeout period minimum, decreasing the length of the timeout period.

7. The method of claim 4, wherein decreasing the length of the timeout period comprises dividing the length of the timeout period by a predetermined factor.

8. The method of claim 2, further comprising initializing a length of the timeout period to a predetermined timeout period minimum at a startup of the SSD.

9. The method of claim 1, wherein the garbage collection module makes the determination of whether the SSD is idle in response to a number of free blocks in the SSD being less than a first free block threshold.

10. The method of claim 9, wherein the garbage collection module further makes the determination of whether the SSD is idle in response to the number of free blocks in the SSD being greater than a second free block threshold, the second free block threshold being less than the first free block threshold.

11. The method of claim 1, wherein the valid page threshold comprises a predetermined value.

12. The method of claim 11, wherein the valid page threshold is about equal to:

$$(1-1/A)*c,$$

wherein A is a target write amplification value for the SSD, and c is a number of pages per memory block in the SSD.

13. The method of claim 1, wherein the valid page threshold comprises an adjustable value that is determined by the garbage collection module based on a number of free blocks in the SSD.

14. The method of claim 1, wherein the valid page threshold comprises an adjustable value that is determined by the garbage collection module based on an average number of valid pages in victim blocks for which garbage collection requests have been issued.

15. The method of claim 1, wherein the SSD comprises a plurality of counters, each of the plurality of counters indicating a number of valid pages in a respective memory block, and wherein the victim block is determined based on the plurality of counters.

16. The method of claim 1, wherein the victim block is determined by directly examining the plurality of memory blocks by the garbage collection module.

17. The method of claim 16, wherein a subset of the plurality of memory blocks is examined by the garbage collection module.

18. A solid state drive (SSD) comprising:

a plurality of memory blocks, each of the plurality of memory blocks comprising a respective plurality of pages; and a SSD controller, the SSD controller comprising a garbage collection module, the garbage collection module being configured to perform a method comprising:

determining whether the SSD is idle;

based on determining that the SSD is idle, determining a victim block from the plurality of memory blocks;

determining a number of valid pages in the victim block;

comparing the determined number of valid pages in the victim block to a valid page threshold; and based on the number of valid pages in the victim block being less than the valid page threshold, issuing a garbage collection request for the victim block.

19. The SSD of claim 18, wherein determining that the SSD is idle comprises:

detecting a first idle condition in the SSD;

based on detecting the first idle condition, starting a timeout period;

based on an expiration of the timeout period, determining whether a second idle condition in the SSD is detected; and based on detecting the second idle condition, determining that the SSD is idle.

20. The SSD of claim 19, further comprising:

based on the number of valid pages in the victim block being greater than the valid page threshold:

determining whether a length of the timeout period is equal to a predetermined timeout period maximum; and based on the length of the timeout period being not equal to the predetermined timeout period maximum, increasing the length of the timeout period; and based on the number of valid pages in the victim block being less than the valid page threshold:

determining whether the length of the timeout period is equal to a predetermined timeout period minimum; and based on the length of the timeout period being not equal to the predetermined timeout period minimum, decreasing the length of the timeout period.

* * * * *